United States Patent
Hamaguchi et al.

(10) Patent No.: US 6,307,716 B1
(45) Date of Patent: Oct. 23, 2001

(54) MAGNETIC DISK DEVICE

(75) Inventors: Tetsuya Hamaguchi; Toshihiko Shimizu, both of Ibaraki-ken; Keiko Watanabe, Tsuchiura; Takeshi Yoshida, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/262,838

(22) Filed: Mar. 5, 1999

(30) Foreign Application Priority Data

Mar. 6, 1998 (JP) .................................. 10-054716

(51) Int. Cl.⁷ .................................................. G11B 21/22
(52) U.S. Cl. ................................................ 360/254.4
(58) Field of Search ................................. 360/250, 254, 360/254.7, 254.6, 254.5, 254.3, 254.4, 254.8, 255, 255.6, 255.7, 255.9

(56) References Cited

U.S. PATENT DOCUMENTS

| | | | |
|---|---|---|---|
| 5,408,375 | * | 4/1995 | Asano ................................ 360/254.8 |
| 5,486,970 | * | 1/1996 | Lee et al. ............................. 360/128 |
| 5,550,695 | * | 8/1996 | Matsumoto ........................... 360/105 |
| 5,585,980 | * | 12/1996 | Boutaghou ........................... 360/105 |
| 5,644,451 | * | 7/1997 | Chan et al. ........................... 360/105 |
| 5,757,587 | * | 5/1998 | Berg et al. ............................ 360/105 |
| 5,764,437 | * | 6/1998 | Meyer et al. ......................... 360/105 |
| 5,870,255 | * | 2/1999 | Hornung et al. ..................... 360/105 |
| 6,014,290 | * | 1/2000 | Supramaniam et al. ............. 360/104 |
| 6,028,745 | * | 2/2000 | Nguyen et al. ..................... 360/254.3 |
| 6,078,474 | * | 6/2000 | Koyanagi et al. ................. 360/254.8 |

FOREIGN PATENT DOCUMENTS 11-250603 * 9/1999 (JP) .

* cited by examiner

Primary Examiner—William Klimowicz
Assistant Examiner—Tianjie Chen
(74) Attorney, Agent, or Firm—Antonelli, Terry, Stout & Kraus, LLP

(57) ABSTRACT

A low cost, reliable and high density magnetic disk device of a ramp loading type, in which a ramp or a dimple or dimples are free from wear even if loading and unloading are repeated. A plurality of dimples are arranged or running tracks are inclined so that the running tracks (ramp), on which a portion (a dimple or dimples) of a magnetic head supporting mechanism runs, includes different tracks at the time of loading and unloading. Alternatively, the magnetic head supporting mechanism has different portions engaging with the ramp at the time of loading and unloading.

6 Claims, 6 Drawing Sheets

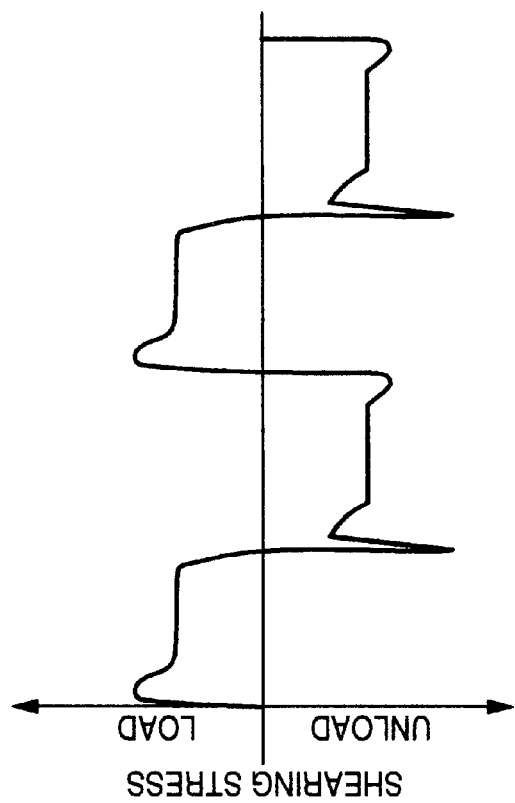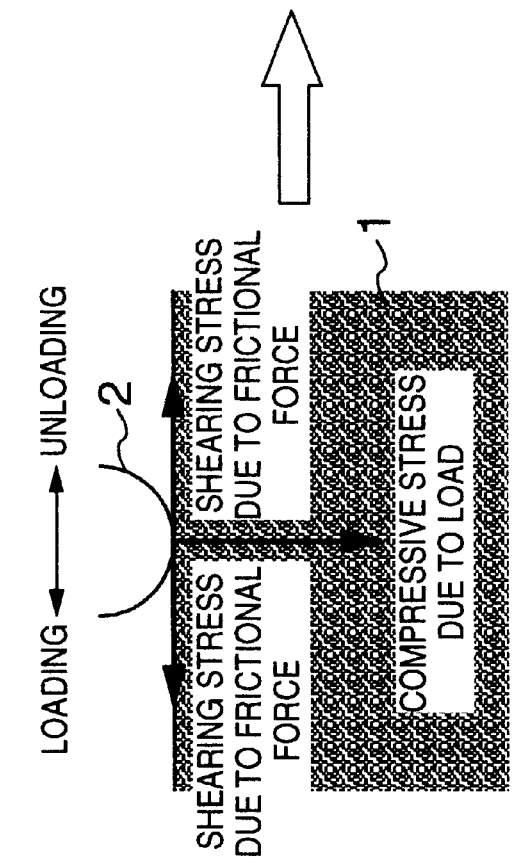

MAGNETIC DISK DEVICE

BACKGROUND OF THE INVENTION

The present invention relates to a magnetic disk device and, more particularly, to a magnetic disk device having a mechanism for loading/unloading a magnetic head supporting mechanism.

Disk devices in the prior art include a system in which a slider is withdrawn (unloaded) out of the disk surface during the suspension of the device, when a disk reaches its normal speed of revolution, the slider is loaded onto the disk surface from its withdrawal position, and when the disk is to be stopped, the slider is unloaded to the withdrawal position prior to slowing-down of the revolution of the disk.

Japanese Patent Unexamined Publication No. 8-263946 discloses a construction in which a ramp corresponding to a withdrawal means provided with a sliding surface inclined toward the disk is provided, and a semispherical-shaped dimple (convex-shaped portion) is provided at the tip of a suspension to slide on the sliding surface.

In the prior art referred to above, the dimple is pressed against a ramp by a pressing load, and frictional forces act on the sliding parts because the dimple runs on the ramp in this state. Accordingly, the ramp and the dimple will wear due to a repeated compressive stress caused by the pressing load and shearing stresses caused by the frictional forces.

In the prior art, the same portion of the dimple slides on the same track on the ramp during loading or unloading. Since the direction of the frictional forces are directed in opposite directions during loading or unloading, those shearing stresses, to which the same portions of the ramp and the dimple are subjected, are alternating (changing in plus and minus sides about zero), thus resulting in a correspondingly greater amplitude of stress.

When the number loading/unloading times (one reciprocation is counted as one round) is N, the ramp and the dimple slide as frequently as 2N times, thus the number of sliding being great.

Wear of the ramp and of the dimple not only adversely affects the loading/unloading performance, but also the resulting worn powder enters into a gap between the slider and the disk, highly possible to cause an irrecoverable failure of the whole device.

SUMMARY OF THE INVENTION

It is an object of the present invention to provide an inexpensive, highly reliable and high density loading/unloading type magnetic disk device in which a dimple is provided at the tip of a suspension and, even when the dimple slides on a ramp repeatedly at the time of loading/unloading, wear of the ramp and the dimple can be reduced.

The above-stated object can be achieved by determining the shape of and the number of the dimples such that a part (the dimple or the like) of a magnetic head supporting mechanism runs on different tracks on the ramp at the time of loading and unloading.

Alternatively, the above object can be achieved by forming the running track on the ramp such that different portions of the magnetic head supporting mechanism engages with the ramp at the time of loading and unloading.

BRIEF DESCRIPTION OF THE DRAWINGS

FIG. 4A is a view showing the relationship among forces acting on the dimple section;

FIG. 4B is a view showing changes in shearing stresses acting on the dimple section of FIG. 4A at the time of loading/unloading;

DESCRIPTION OF THE EMBODIMENTS

First a state of acting forces will be described when a dimple is provided at the tip of a suspension with reference to FIGS. 4A and 4B. FIG. 4A shows a sliding direction and acting forces, and FIG. 4B shows a state of a change in shearing stresses.

As shown in FIG. 4A, the dimple is pressed against a running track on a ramp section by a pressing load. Frictional force acts on the sliding parts because the dimple runs on the running track in this state. Thus, as described above, the ramp and the dimple wear due to repeated action of a compressive stress caused by the pressing load and of shearing stresses caused by the frictional forces. If there is provided only one dimple, loading and unloading are alternately repeated as shown in FIG. 4B, and so shearing stresses of a large alternating amplitude will act. The present invention provides a construction for reducing this shearing stresses, and undergoing less wear.

Figure 1:
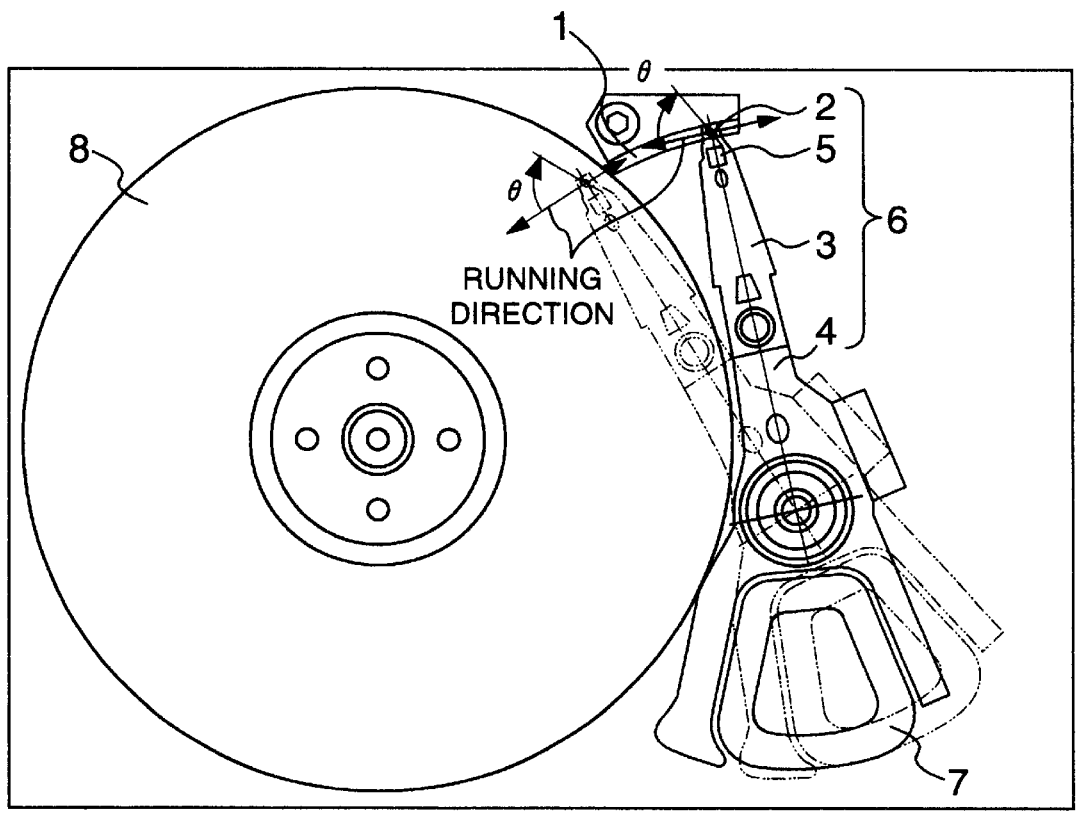
FIG. 1 shows a plan view of a magnetic disk device according to the present invention.

One preferred embodiment of the invention is shown in FIG. 1.

Referring to FIG. 1, a magnetic head and a slider 5 mounting thereon the head (hereinafter called a magnetic head slider) is supported by a suspension 3, and these constituent elements are mounted to an arm 4. A magnetic head supporting mechanism 6, which is an assembly of these constituent elements, combines with a drive mechanism 7 to constitute a rotating actuator. A ramp equipped with a running track 1 is provided at the outermost periphery of a magnetic disk 8 where the tip of the suspension 3 runs and stands by. The suspension 3 is provided at a tip thereof with a hull bottom-shaped projection 2 (referred herein-below to a hull bottom-shaped dimple), which slides on the running track 1. Rotation of the rotating actuator in a manner shown during revolution of the magnetic disk 8 causes the magnetic head slider 5 to be loaded onto or unloaded off the disk.

As described above, in this embodiment, the dimple 2 is shaped like a hull bottom, whose longitudinal direction is inclined at an angle of θ (about 60 degrees in this embodiment) relative to the running direction at the time of loading/unloading. This angle need not be 60 degrees, but the direction is inclined relative to the running direction, i.e. the angle is other than 0, 90, 180 or 360 degrees, the invention can be effectively embodied.

Figure 2:
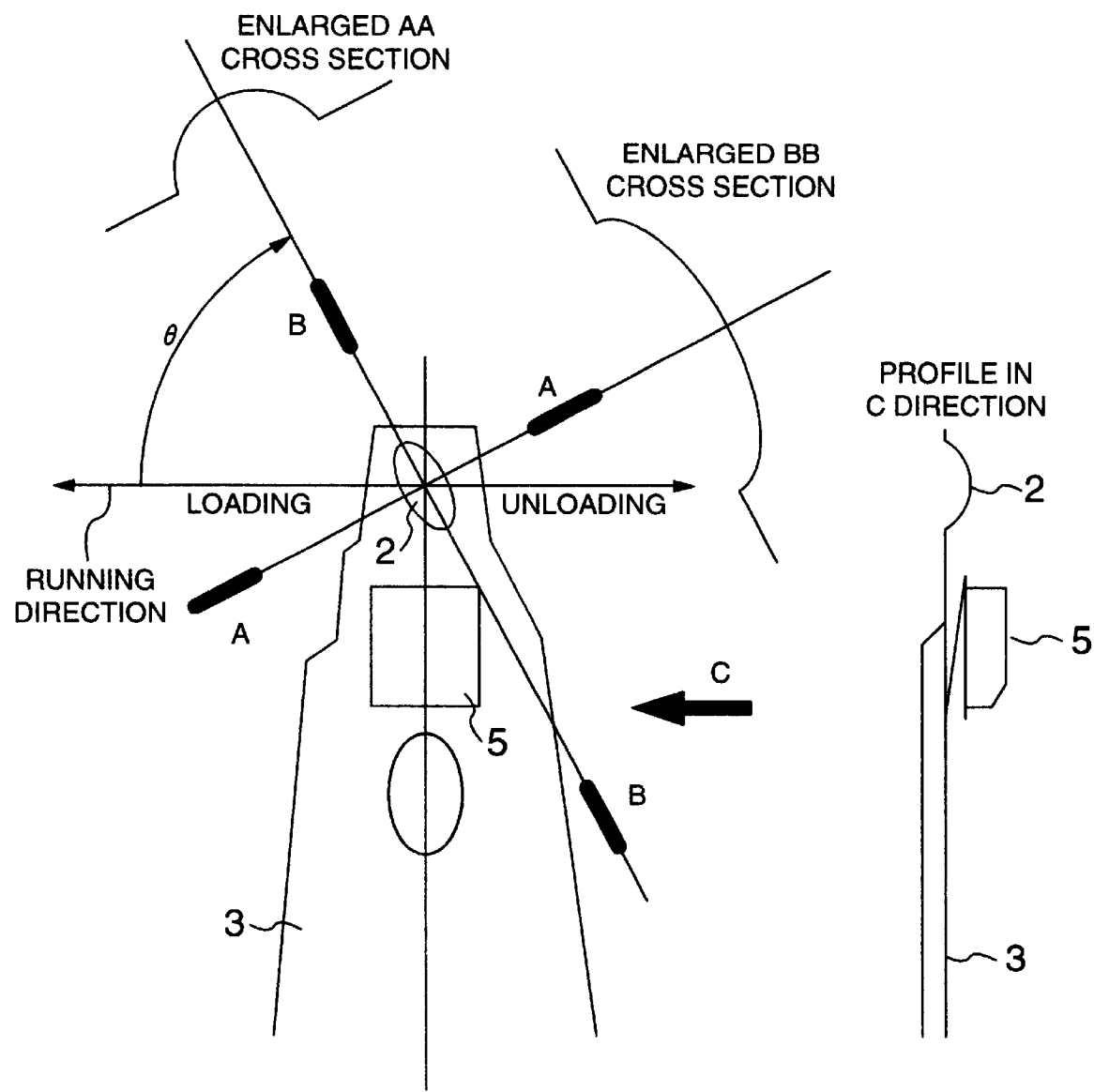
FIG. 2 shows enlarged views of and a partly enlarged cross sectional view of a dimple and its vicinities in FIG. 1.

FIG. 2 shows an enlarged view of the dimple 2 and its vicinities in the suspension 3.

As shown in the drawing, the hull bottom-shaped dimple 2 is arranged farther toward the tip of the suspension 3 than a mount for the magnetic head slider 5, and this hull bottom-shaped dimple 2 is lifted up and down by the ramp to cause the magnetic head slider 5 to be loaded onto and unloaded off the disk surface. As shown in enlarged AA and BB cross sections of the hull bottom-shaped dimple 2, the hull bottom-shaped dimple is convex-shaped with a curvature as viewed in either direction, the BB cross section being longer than the AA cross section. This dimple 2 can be formed by means of press working with a die when the suspension 3 is formed. The curvature need not be particularly great, but may be a minimum curvature required for press working.

The effects in this embodiment will be described below with reference to FIG. 3. During loading, the dimple 2 runs sliding on the surface of the ramp 1 from right to left in the drawing. At this time, frictional forces act on the dimple 2 from left to right in the drawing. As portions of the suspension 3 near the dimple are liable to twist slightly around an axis of twist shown in the drawing, the aforementioned frictional forces turns the whole dimple 2 slightly around the axis of twist. This makes a point P1 the point of contact between the dimple 2 and the ramp 1. During unloading, the dimple 2 runs sliding on the surface of the ramp 1 from left to right in the drawing. At this time, frictional forces in an opposite direction to that during loading will act to turn the whole dimple 2 somewhat, which makes a point P2 the point of contact.

As a result, the dimple slides on different tracks on the ramp 1 during loading and unloading as shown. Thus different points on the dimple undergo sliding during loading and unloading. Therefore, the number of times when the same points on the ramp and the dimple undergo sliding is a half the number of times experienced in the prior art, that is, the same points undergo sliding N times in N reciprocating movements, and so the number of times in this embodiment can reduce by half. Moreover, because the same points on the ramp and the dimple undergo sliding only in the same direction in regard to shearing stresses, the stresses are made pulsating, and the stress amplitude is a half that in the prior art. Generally, the number of sliding movements is a half that in the prior art, the amplitude of shearing stresses is a half that in the prior art, the stresses are made pulsating, and the ramp and the dimple wear at a speed of about one fourth that in the prior art.

Figure 3:
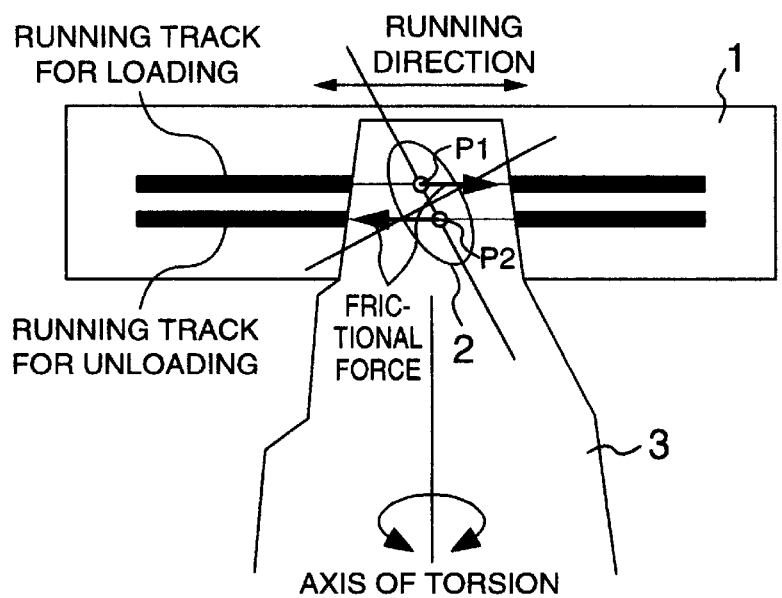
FIG. 3 shows a plan view for the purpose of explaining an action according to the invention.
Figure 5:
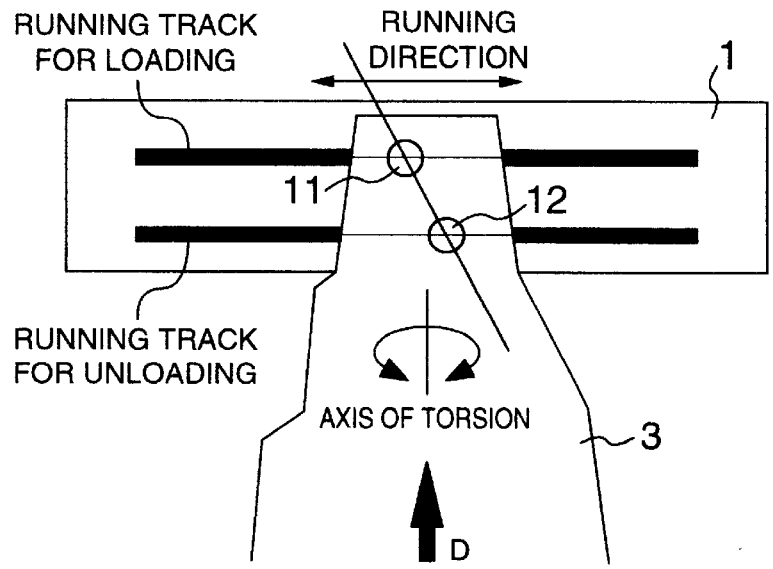
FIG. 5 is a plan view of the dimple section and its vicinities according to the invention.

Another embodiment is shown in FIG. 5, which shows a part similar to that in FIG. 3, i.e. the tip of the suspension 3 and the ramp. In this embodiment, two semispherical-shaped, convex dimples 11 and 12 are provided such that a line connecting their centers is inclined by θ relative to the running direction of the suspension 3.

Figure 6A:
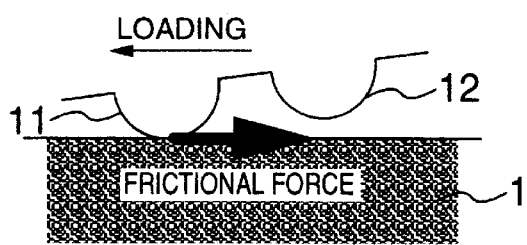
FIGS. 6A and 6B are views illustrating states of the ramp section and the dimple section at the time of loading according to the invention.
Figure 6B:
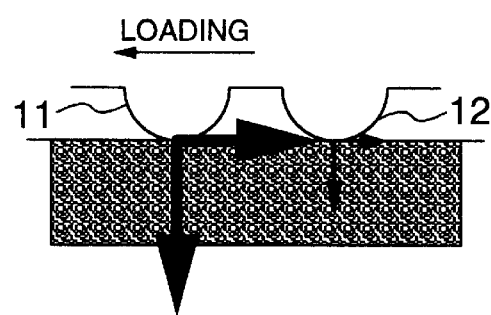
Figure 6C:
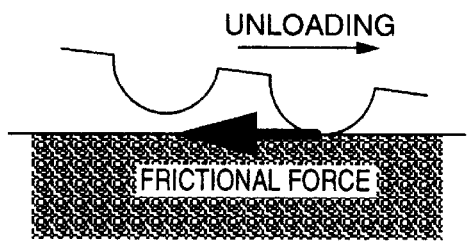
FIGS. 6C and 6D are views illustrating states of the ramp section and the dimple section at the time of unloading according to the invention.
Figure 6D:
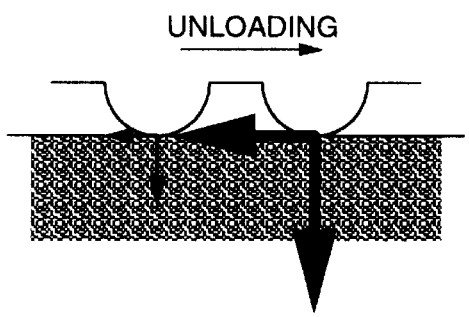

The effects of this embodiment will be described below with reference to FIGS. 6A through 6D, which show side views, as viewed in the C direction, of the embodiment illustrated in FIG. 5. At the time of loading, the frictional forces on the dimple 11 and the ramp 1 slightly twists the suspension 3 with the result that only the dimple 11 slides in contact with the ramp 1. During this movement, the dimple 12 is in a state, in which it floats slightly off the ramp 1 (FIG. 6A). Alternatively, the dimple 12 may be designed not be twisted until it floats. Even in this case, as shown in FIG. 6B, load distributions in the dimples 11 and 12 become uneven. Thus, at the time of loading, what slides under load is mainly the dimple 11. At the time of unloading, however, the dimple 12 mainly slides under load (FIG. 6C or FIG. 6D). As a result, the dimple runs mainly under load and frictional forces on different tracks during loading and unloading as shown in FIG. 5. The effects resulted from such phenomenon are exactly the same as in the case of FIG. 3.

While the foregoing embodiments have been described with reference to a state in which the dimple is running on the ramp, a state in which the dimple is standing by on the ramp is also covered by the present invention. In a magnetic disk device of ramp loading type, when the apparatus is not running or, even if running, is in a sleeping state, the magnetic head slider is either standing by in an unloaded state or the rotating actuator is made to lock so that external forces such as an impact force will not cause the magnetic head slider to run. In this state, the dimple is standing by in a portion on the ramp, and the ramp may be provided with a stand-by area. When an external vibrating force acts from outside in a state in which the dimple is standing by, the dimple will slide reciprocatingly on the ramp in a minute range. Such minute sliding reciprocation is said to be the most strict condition for a sliding member, which would then cause wear in a short period of time. Exactly the same effects as those in the above-described running state are exhibited in the magnetic disk device according to the present invention in phenomenons in such a stand-by state, and wear proceeds in a much slower speed than in the prior device.

Figure 7:
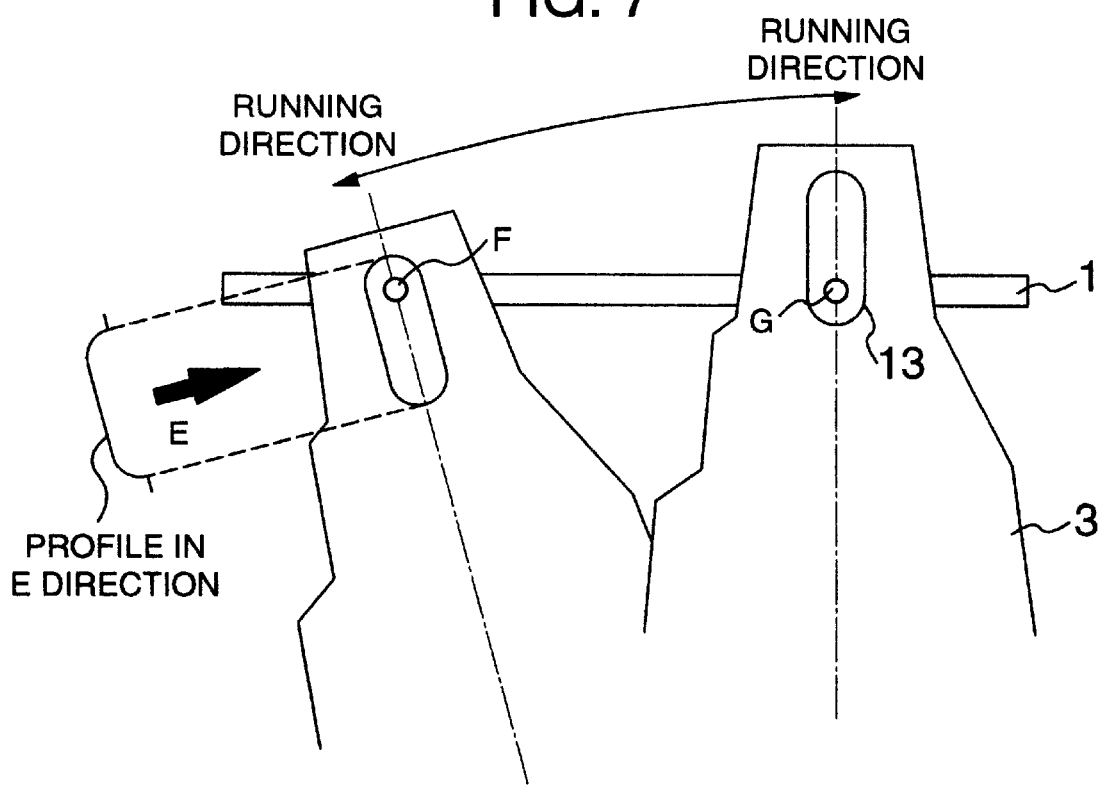
FIG. 7 is a plan view of the dimple and its vicinities in a further embodiment of the invention.

FIG. 7 shows a still another embodiment of the present invention. Depending on materials used, the dimple may wear more markedly than the running track on the ramp section. According to this embodiment, the running track on the ramp section is arranged to be convex as shown in FIG. 7, so that the point of contact on the dimple moves between point G and point F in FIG. 7 as the arm is rotatingly driven. As a result, the dimple contacts with the running track on the ramp section at not one point, but the point of contact on the dimple constantly moves to reduce wear of the dimple. Incidentally, in this case, instead of providing any dimple at the tip of the suspension, a convex-shaped running track may be formed to be in non-parallel with the running direction so that the contact point between the tip of the suspension and the running track is made to constantly vary.

Figure 8:
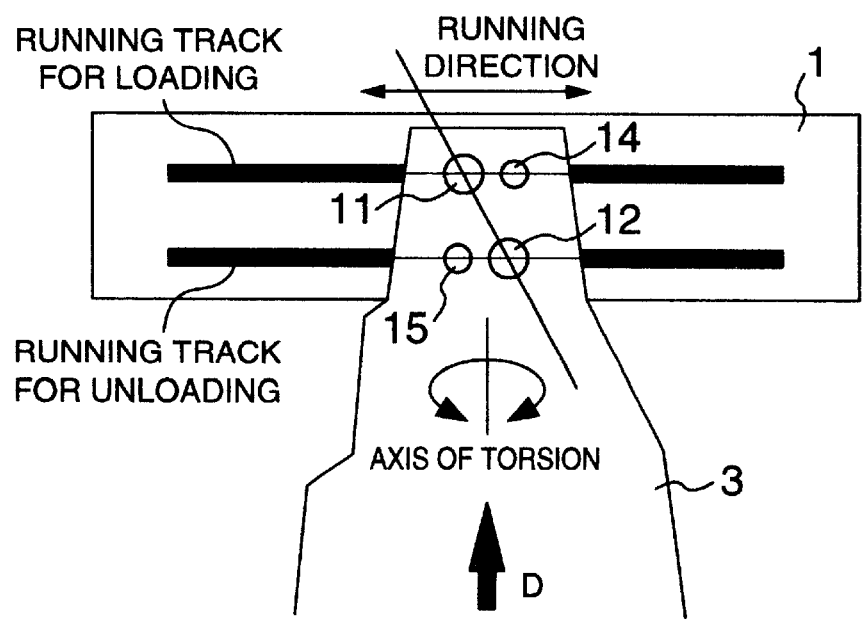
FIG. 8 is a plan view of the dimple and its vicinities in a still further embodiment of the invention.

A still further embodiment of the present invention is shown in FIG. 8.

Depending on a material used, worn powder of the material of the ramp may accumulate on the dimple, fall on the ramp and enter into the sliding parts to accelerate wear of the ramp. In such case, according to this embodiment, two dimples (11 and 14; 12 and 15), respectively, are provided for the same running track, and one of the dimples is formed to be greater in height than the other of the dimples. Thus, the dimples (11 and 12) at a predetermined angle of θ are made greater in height than the other dimples (14 and 15). With this arrangement, the dimple 11 mainly bears a load and the dimple 14 lightly contacts with the running track during loading. During unloading, the dimple 12 mainly bears a load and the dimple 15 lightly contacts with the running track. Thus the same effects as those of the earlier described embodiments are exhibited in this embodiment, and worn powder accumulated on the dimples is held between the dimples to be made hard to fall, thus resulting in further reduction of wear.

Figure 9:
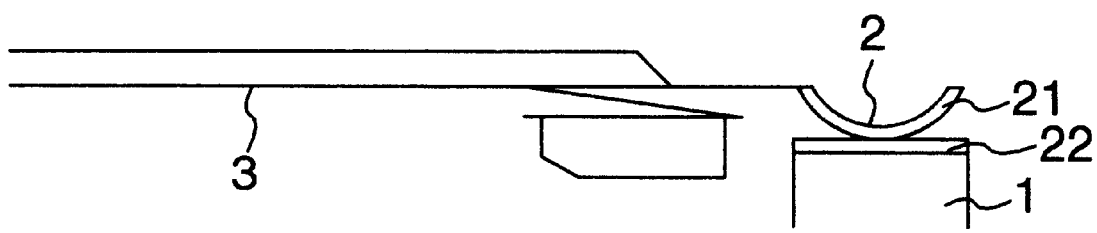
FIG. 9 is a plan view of the dimple and its vicinities in a further embodiment of the invention.

As a measure for reducing wear of the ramp and of the dimple or dimples, contrivance is effectively made with respect to materials for these constituent elements, one example being shown in FIG. 9. In terms of cost saving, a resin called a liquid crystal polymer is the most suitable for the ramp. In order to reduce wear, it is desirable that a liquid or solid lubricant layer 21 be provided on the surfaces of the ramp 1, and used in combination with the present invention shown in FIG. 2. The present invention is made further effective by the provision of a liquid or solid lubricant layer 22 on the surfaces of the dimple or dimples.

Figure 10:
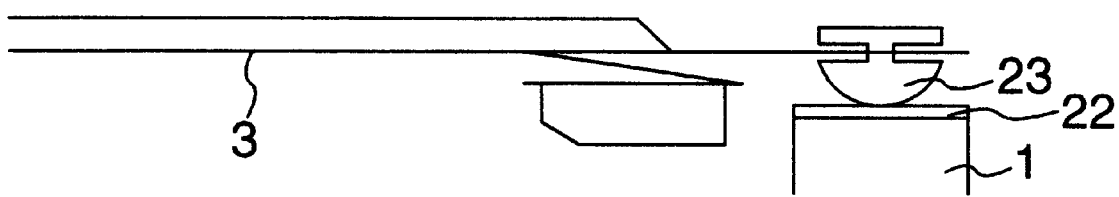
FIG. 10 is a plan view of the dimple and its vicinities in a still further embodiment of the invention.

As shown in FIG. 10, it is also effective to form a dimple 23 of a resin material at the tip of the suspension 3. Since the ramp 1 is also made of a resin material, the resin materials will slide in contact with each other, resulting in less stress exerted on the ramp 1 than that exerted on a metallic dimple, which accordingly reduces wear. In this case, the use of this method in combination with the present invention shown in FIG. 2 will result in enhanced effects.

As described above, according to the present invention, wear of the ramp and of the dimple or dimples, and the resulting dust are exceedingly reduced in a very simple and inexpensive method, so that reliability in loading/unloading actions and in low floating property of the slider. Accordingly, magnetic disk devices of high recording density can be supplied at low price.

What is claimed is:

1. A magnetic disk device comprising a magnetic head supporting mechanism composed of a magnetic head for recording information on and reproducing information from a magnetic disk, a suspension for supporting a slider provided with said magnetic head, and an arm for supporting said suspension; a drive mechanism for moving said magnetic head supporting mechanism to a predetermined position; said magnetic disk for recording thereon information, and a stationary ramp section having running tracks which enable a tip end of said magnetic head supporting mechanism to be loaded onto said magnetic disk or unloaded therefrom, and wherein said magnetic head supporting mechanism runs on different running tracks on said stationary ramp section at the time of loading and unloading.

2. The magnetic disk device as set forth in claim 1, wherein said magnetic head supporting mechanism has a portion at the tip end which is adapted to engage with said running tracks, and which comprises an elongated, spherical-shaped dimple in the form of a convex hull bottom shape disposed so that its longitudinal direction is inclined relative to a running direction of said running tracks.

3. The magnetic disk device as set forth in claim 1, wherein said magnetic head supporting mechanism has a portion at the tip end which is adapted to engage with said running tracks, and which comprises a plurality of convex dimples, at least two of which are arranged at intervals in a direction perpendicular to a running direction of said running tracks.

4. A magnetic disk device comprising a magnetic head supporting mechanism composed of a magnetic head for recording information on and reproducing information from a magnetic disk, a suspension for supporting a slider provided with said magnetic head, and an arm for supporting said suspension; a drive mechanism for moving said magnetic head supporting mechanism to a predetermined position; said magnetic disk for recording thereon information, and a stationary ramp section having running tracks which enable a tip end of said magnetic head supporting mechanism to be loaded onto said magnetic disk or unloaded therefrom, and wherein said magnetic head supporting mechanism has different portions engaging with said running tracks at the time of loading and at the time of unloading.

5. The magnetic disk device as set forth in claim 4, wherein said magnetic head supporting mechanism has a portion at the tip end which is adapted to engage with said running tracks, and which comprises an elongated, spherical-shaped dimple in the form of a convex hull bottom shape, disposed so that its longitudinal direction is inclined relative to a running direction of said running tracks.

6. The magnetic disk device as set forth in claim 4, wherein said magnetic head supporting mechanism has a portion at the tip end which is adapted to engage with said running tracks, and which comprises a plurality of convex dimples, at least two of which are arranged at intervals in a direction perpendicular to a running direction of said running tracks.

* * * * *